United States Patent
Yasui et al.

(10) Patent No.: US 8,354,034 B2
(45) Date of Patent: Jan. 15, 2013

(54) METHOD OF MANUFACTURING A MAGNETIC HEAD

(75) Inventors: Nobuto Yasui, Yokohama (JP); Shinji Sasaki, Yokohama (JP); Kazuhito Miyata, Sagamihara (JP); Mineaki Kodama, Odawara (JP)

(73) Assignee: Hitachi Global Storage Technologies Netherlands BV, Parnassustoren, Amsterdam ( * ) Notice: Subject to any disclaimer, the term of this patent is extended or adjusted under 35 U.S.C. 154(b) by 758 days.

(21) Appl. No.: 12/491,741

(22) Filed: Jun. 25, 2009

(65) Prior Publication Data
US 2009/0321389 A1 Dec. 31, 2009

(30) Foreign Application Priority Data
Jun. 25, 2008 (JP) .................. 2008-165632

(51) Int. Cl.
*B44C 1/22* (2006.01)
(52) U.S. Cl. ..................... 216/22; 360/235.2
(58) Field of Classification Search ............ None
See application file for complete search history.

(56) References Cited

U.S. PATENT DOCUMENTS

| 4,278,493 | A * | 7/1981 | Petvai ................ 204/192.32 |
| 6,551,438 | B1 * | 4/2003 | Tanemura ................ 156/265 |
| 2008/0062579 | A1 * | 3/2008 | Yasui et al. ............. 360/324.2 |
| 2008/0218910 | A1 * | 9/2008 | Kojima et al. ............. 360/319 |

FOREIGN PATENT DOCUMENTS
JP 3153167 4/2001

* cited by examiner

*Primary Examiner* — Binh X Tran
*Assistant Examiner* — David Cathey, Jr.
(74) *Attorney, Agent, or Firm* — Matthew A. Pequignot; Pequignot + Myers LLC

(57) ABSTRACT

A magnetic head suitable for high-density recording is provided at a high yield by a method that suppresses a reduction in reproducing output signal due to ion-beam irradiation. After an air-bearing surface of a read element, a magnetic-head element, or a row bar is mechanically polished, the air-bearing surface is irradiated with an ion beam, such that an orthographic projection of an ion-beam incidence direction onto the air-bearing surface forms an in-plane incidence angle of 30 degrees to 150 degrees or of 210 degrees to 330 degrees with respect to a track-width direction. Thereby, the formation of a short circuit due to ion-beam irradiation may be hindered.

16 Claims, 12 Drawing Sheets

| | MANUFACTURING METHOD | NON-DEFECTIVE PRODUCT RATIO |
|---|---|---|
| EXAMPLE 1 | IN-PLANE ANGLE IS CONTROLLED TO 90 DEGREES | 100% |
| COMPARATIVE EXAMPLE 1 | IN-PLANE ANGLE IS NOT CONTROLLED | 71% |
| COMPARATIVE EXAMPLE 2 | IN-PLANE ANGLE IS CONTROLLED TO 0 DEGREES | 1% |

(a)

TEM PHOTOGRAPH OF MAGNETIC HEAD HAVING NO REDUCTION
IN RESISTANCE DUE TO ION BEAM IRRADIATION (b)

TEM PHOTOGRAPH OF MAGNETIC HEAD HAVING REDUCTION
IN RESISTANCE DUE TO ION BEAM IRRADIATION

METHOD OF MANUFACTURING A MAGNETIC HEAD

CROSS-REFERENCE TO RELATED APPLICATIONS

The present invention claims priority from Japanese Patent Application No. 2008-165632, filed on Jun. 25, 2008, which is incorporated herein by reference.

TECHNICAL FIELD OF THE INVENTION

The present invention relates to a method of manufacturing a magnetic head comprising a read element including a magnetoresistive film.

BACKGROUND OF THE INVENTION

Recently, the recording density of magnetic recording devices has rapidly increased, concurrently with an increase in the amount of information to be handled. Therefore, a magnetic head including a read element having a high sensitivity and a high reproducing output signal is now required. To meet this requirement, a magnetic head comprising a read element including a giant-magnetoresistive (GMR) film to provide a high reproducing output signal has been developed and further refined to present. Furthermore, research and development of a read element including, as a next-generation magnetoresistive film, a tunnel-magnetoresistive (TMR) film or a current-perpendicular-to-the-plane (CPP) GMR film, in which current flows through stacked surfaces of the GMR film, is underway in order to further increase sensitivity and reproducing output signal.

A read element including a TMR film or a CPP-GMR film has a structure different from that of a read element including a conventional GMR film. In the latter instance, the read element has a current-in-the-plane (CIP) structure, in which a sensing current flows in a direction in a plane of stacked surfaces of the GMR film, and electrodes for supplying the sensing current are provided on both sides of the GMR film. On the other hand, in the former instance, since the read element has a CPP structure, in which a sensing current flows in a direction perpendicular to a plane of stacked surfaces of the TMR film or the CPP-GMR film, electrodes for supplying the sensing current are stacked on the magnetoresistive film.

As described hereafter, the magnetic properties of a read element having a CPP structure may be significantly degraded during manufacture of a magnetic head including the read element. In such a read element having a CPP structure, a sensing current flows perpendicularly to stacked surfaces in a thickness direction of a magnetoresistive film between an upper magnetic shield, which may act as an upper electrode, and a lower magnetic shield, which may act as a lower electrode. Therefore, when a circuit in the read element having the CPP structure short-circuits between the upper magnetic shield and the lower magnetic shield, the circuit becomes a short circuit for the sensing current, leading to a reduction in the reproducing output signal of the read element.

The short circuit is formed on an end face at an air-bearing-surface side of the magnetoresistive film, when the magnetoresistive film is processed by mechanical polishing, leading to a reduction in the reproducing output signal of the read element. Several methods have been proposed for the purpose of hindering the formation of the short circuit, which degrades the original properties of the magnetoresistive film. Japanese Patent No. 3153167 discloses means for hindering the formation of such a short circuit by performing ion-beam irradiation after mechanical polishing.

However, even in instances where the formation of such a short circuit was hindered by ion-beam irradiation, a reduction in the resistance or the reproducing output signal of the read element nevertheless occurred. As a result, many conventional magnetic heads include a read element with a low signal-to-noise (S/N) ratio, which impedes the attainment of desired properties.

SUMMARY OF THE INVENTION

In light of this problem, an object of the present invention is to provide a magnetic head including a read element by a method that suppresses a reduction in the reproducing output signal of the read element due to ion-beam irradiation subsequent to mechanical polishing. The magnetic head, which is suitable for high-density recording, can be manufactured at a high yield.

To develop such a method of manufacturing a magnetic head, the inventors first made detailed investigations on a conventional manufacturing method. As a result, they found that the aforementioned reduction in the resistance or the reproducing output signal of a read element of a magnetic head manufactured by the conventional method was partially caused by ion-beam irradiation.

During ion-beam irradiation, when an orthographic projection of an ion-beam incidence direction onto an air-bearing surface of the read element of the magnetic head forms an angle of greater than or equal to 0 degrees and less than 30 degrees, of greater than 150 degrees and less than 210 degrees, or of greater than 330 degrees and less than 360 degrees with respect to a track-width direction of the magnetic head, incident ions may sputter an adjacent hard-bias layer, such as a magnetic-domain-control film, in the track-width direction. Sputtered material from the hard-bias layer may then adhere to a surface of a refill film adjacent to a magnetoresistive film, resulting in the formation of a short circuit. Thus, ion-beam irradiation may cause a reduction in the resistance or the reproducing output signal of the read element of the magnetic head.

In light of the above mechanism, the inventors performed ion-beam irradiation such that the orthographic projection of the ion-beam incidence direction onto the air-bearing surface of the read element of the magnetic head formed an angle of 30 degrees to 150 degrees or of 210 degrees to 330 degrees with respect to the track-width direction of the magnetic head and, thereby, succeeded in suppressing the aforementioned reduction in the resistance or the reproducing output signal of the read element of the magnetic head caused by ion-beam irradiation. Thus, a magnetic head suitable for high-density recording was provided at a high yield.

Accordingly, the present invention relates to a method of manufacturing a magnetic head comprising a read element including a magnetoresistive film, said method comprising: mechanically polishing an air-bearing surface of the read element; and irradiating the air-bearing surface of the mechanically polished read element with an ion beam, such that an in-plane incidence angle, formed by an orthographic projection of an ion-beam incidence direction onto the air-bearing surface of the read element and by a track-width direction of the magnetic head, is of 30 degrees to 150 degrees or of 210 degrees to 330 degrees.

Another aspect of the present invention relates to a method of manufacturing a plurality of magnetic heads, comprising: forming a plurality of magnetic-head elements on a wafer, each magnetic-head element comprising a read element including a magnetoresistive film; cutting the wafer into row bars, each row bar comprising a respective plurality of magnetic-head elements in a row; mechanically polishing an air-bearing surface of each row bar; cleaning the mechanically polished air-bearing surface of each row bar by using a directional ion beam, including: setting the row bars on a pallet, such that the magnetic-head elements are parallel or antiparallel to one another in a track-width direction of the magnetic-head elements, and irradiating the air-bearing surface of each row bar with the ion beam, such that an in-plane incidence angle, formed by an orthographic projection of an ion-beam incidence direction onto the air-bearing surface of each row bar and by the track-width direction, is of 30 degrees to 150 degrees or of 210 degrees to 330 degrees; forming an air-bearing-surface protective film on the cleaned air-bearing surface of each row bar; forming a rail, pads, and a deep groove on the air-bearing surface bearing the air-bearing-surface protective film of each row bar; and cutting each row bar into the respective plurality of magnetic-head elements.

Another aspect of the present invention relates to a method of manufacturing a plurality of magnetic heads, comprising: forming a plurality of magnetic-head elements on a wafer, each magnetic-head element comprising a read element including a magnetoresistive film; cutting the wafer into row bars, each row bar including a respective plurality of magnetic-head elements in a row; mechanically polishing an air-bearing surface of each row bar; cutting each row bar into the respective plurality of magnetic-head elements; cleaning a mechanically polished air-bearing surface of each magnetic-head element by using a directional ion beam, including: setting the magnetic-head elements on a pallet, such that the magnetic-head elements are parallel or antiparallel to one another in a track-width direction of the magnetic-head elements, and irradiating the air-bearing surface of each magnetic-head element with the ion beam, such that an in-plane incidence angle, formed by an orthographic projection of an ion-beam incidence direction onto the air-bearing surface of each magnetic-head element and by the track-width direction, is of 30 degrees to 150 degrees or of 210 degrees to 330 degrees; forming an air-bearing-surface protective film on the cleaned air-bearing surface of each magnetic-head element; and forming a rail, pads, and a deep groove on the air-bearing surface bearing the air-bearing-surface protective film of each magnetic-head element.

Thus, according to the present invention, a reduction in a reproducing output signal of a read element of a magnetic head may be suppressed. As a result, a magnetic head suitable for high-density recording can be obtained at a high yield.

BRIEF DESCRIPTION OF THE DRAWINGS

The present invention will be described in greater detail with reference to the accompanying drawings, wherein.

DETAILED DESCRIPTION OF THE INVENTION

Figure 2:
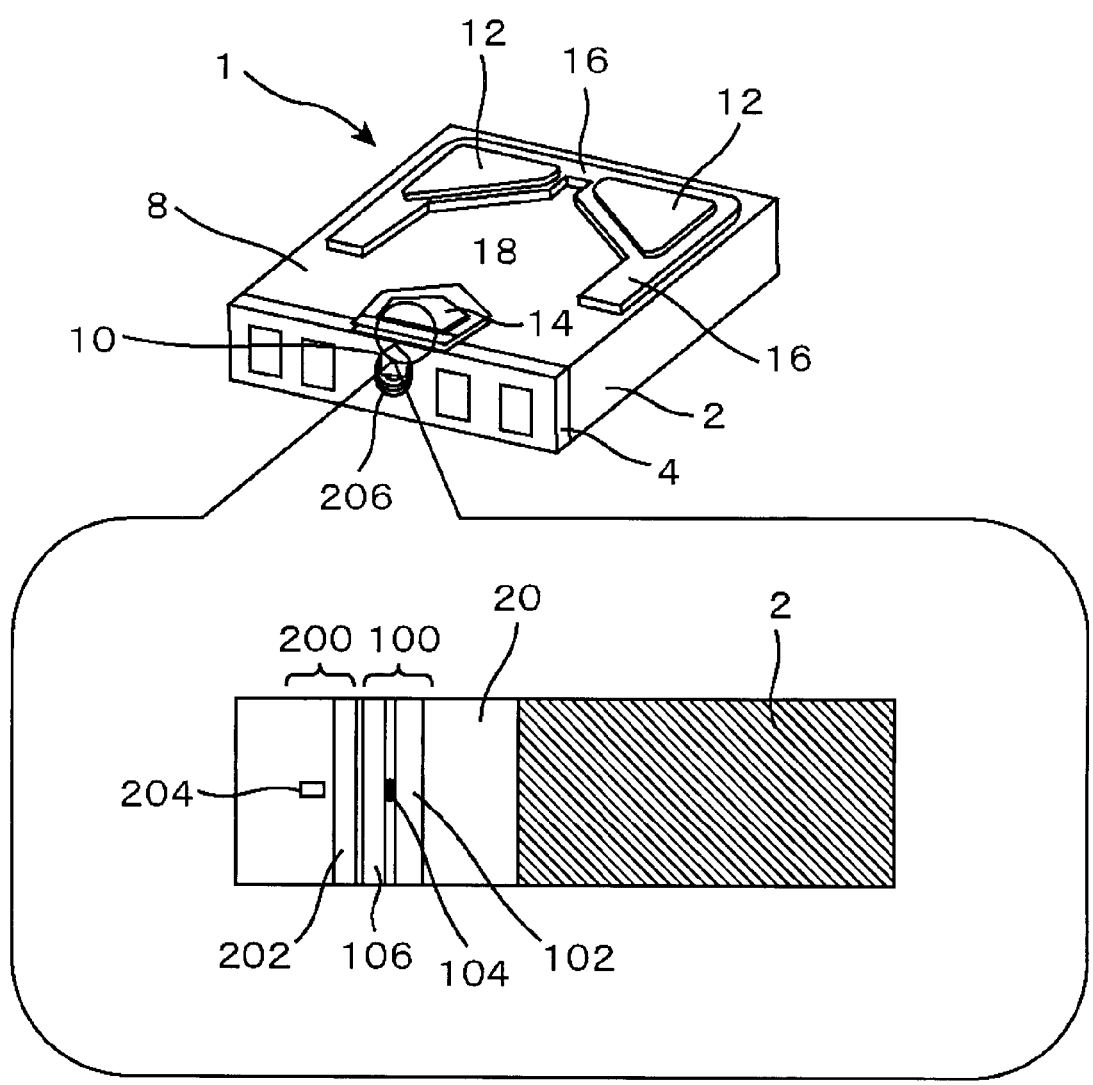
FIG. 2 is a perspective view of a magnetic head manufactured according to the present invention and an enlarged view of a magnetic-head-element portion of the magnetic head.

First, an embodiment of a magnetic head 1 manufactured according to the present invention is described with reference to FIG. 2. An upper part of FIG. 2 shows a perspective view of the magnetic head 1 from an air-bearing-surface side, and a lower part thereof shows an enlarged view of a magnetic-head-element portion 4 of the magnetic head 1 from the air-bearing-surface side. The magnetic head 1 includes a substrate 2, also known as a slider, and the magnetic-head-element portion 4, which is formed on an end face of the substrate 2. An air-bearing surface 8 of the substrate 2, which faces a magnetic disk, includes inflow pads 12, an outflow pad 14, a shallow-groove rail 16, and a deep groove 18, which are necessary for maintaining the magnetic head 1 at a predetermined flying height with respect to the magnetic disk. The outflow pad 14 extends over the substrate 2 and the magnetic-head-element portion 4, and an end of a magnetic-head element 10 is situated on the outflow pad 14. The magnetic-head element 10, which includes a read element 100 and a write element 200, is formed on an insulating layer 20 included in the magnetic-head-element portion 4. The read element 100 includes a lower magnetic-shield layer 102, a magnetoresistive film 104, such as a TMR film, and an upper magnetic-shield layer 106. The write element 200 includes a lower magnetic layer 202 including an inductive-type element, an upper magnetic layer 204, and a coil 206. While the magnetic head 1 shown in FIG. 2 includes both the read element 100 and the write element 200, a magnetic head 1 including only the read element 100 may also be used.

Figure 3:
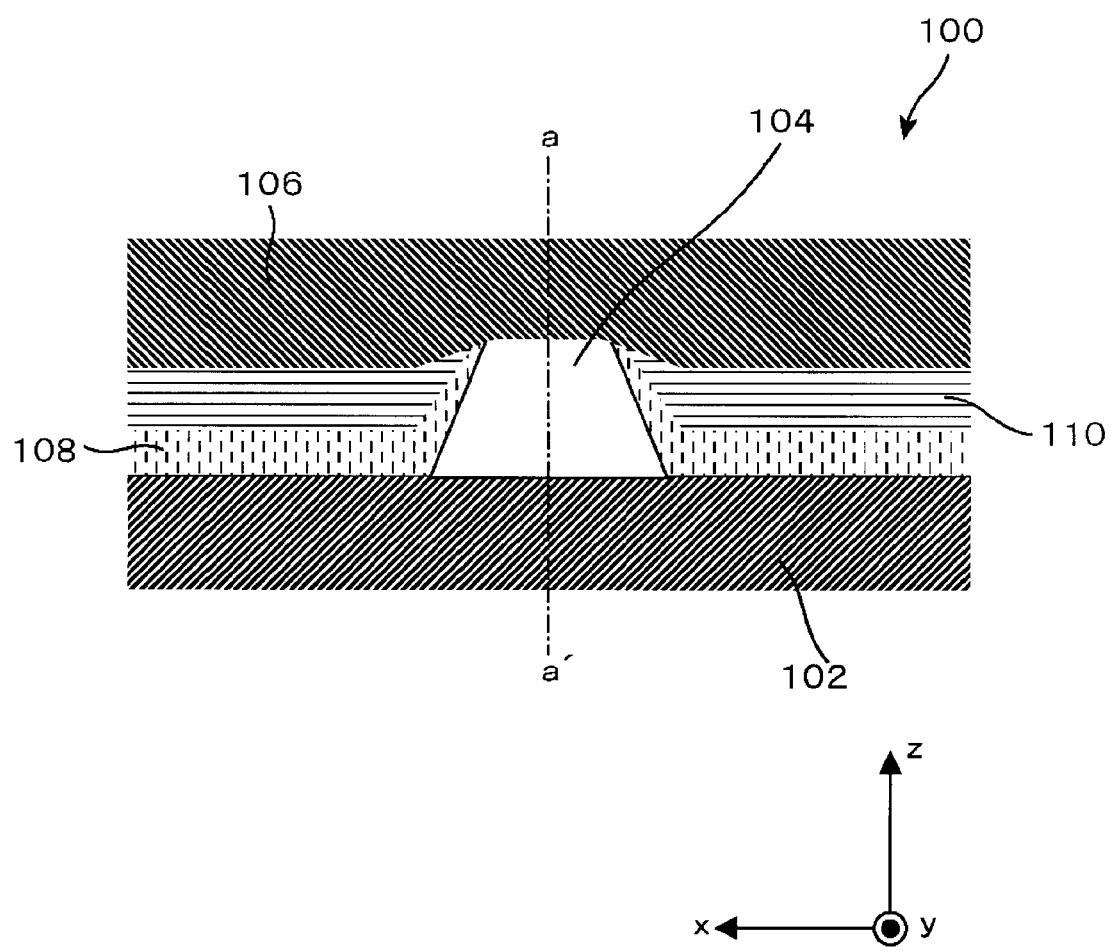
FIG. 3 is a cross-sectional view, perpendicular to an element-height direction, of a read element of the magnetic head of FIG. 2.
Figure 4:
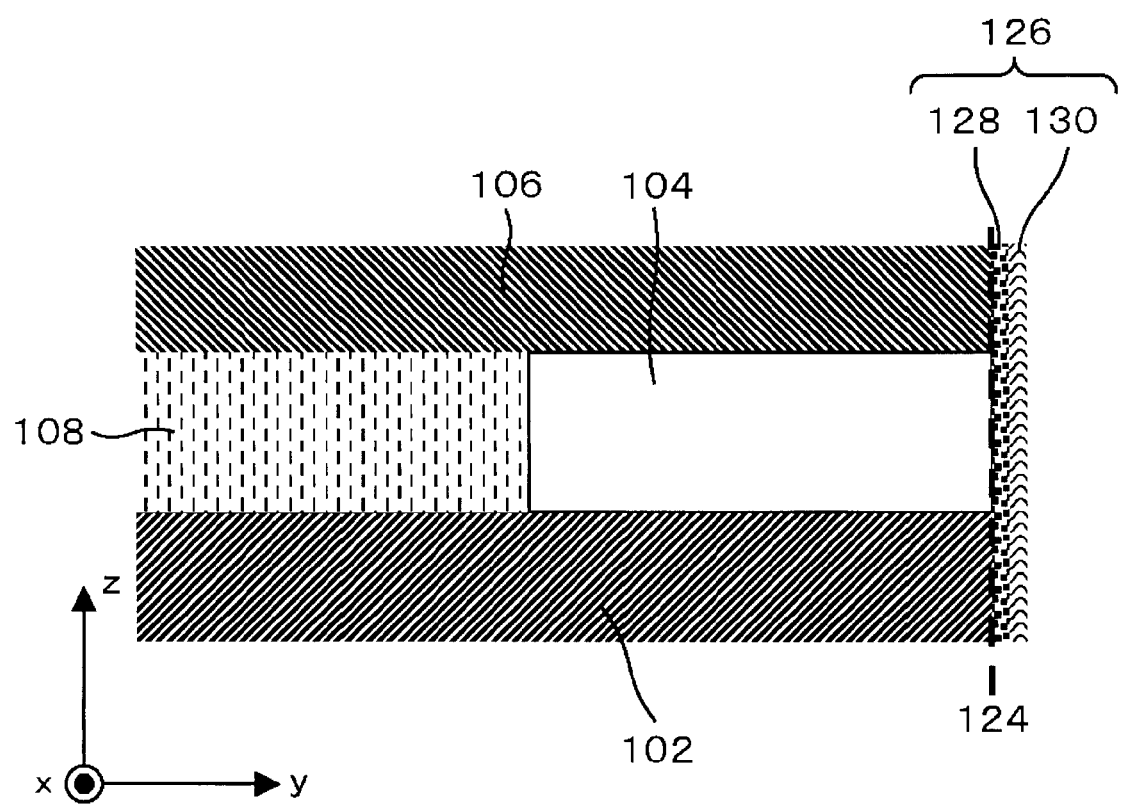
FIG. 4 is a cross-sectional view, perpendicular to a track-width direction, of the read element of FIG. 3, along the line a-a'.
Figure 5:
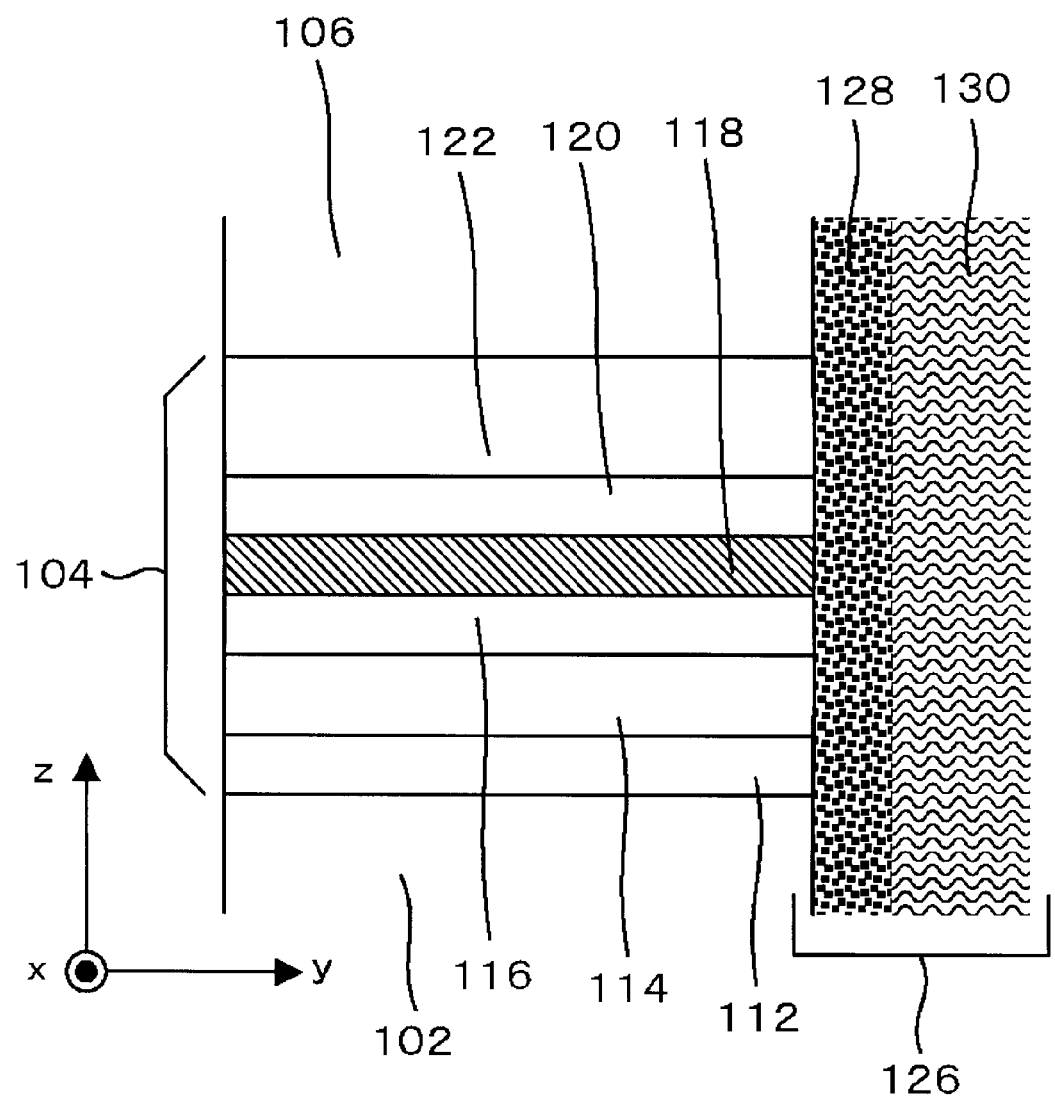
FIG. 5 is an enlarged view of a magnetoresistive film of the read element of FIG. 4.

Next, a configuration of the read element 100 and an air-bearing-surface protective film 126 is described with reference to FIGS. 3, 4, and 5. FIG. 3 shows a cross section, perpendicular to an element-height direction and parallel to the magnetic disk, of the read element 100, wherein the x, y, and z axes represent a track-width direction, the element-height direction, and a stacked-film thickness direction of the magnetic head 1, respectively. FIG. 4 shows a cross section, perpendicular to the track-width direction, along the line a-a' in FIG. 3. FIG. 5 shows an enlarged view of part of the cross section of FIG. 4. In FIGS. 4 and 5, the x, y, and z axes are the same as those in FIG. 3.

As shown in FIG. 3, in the read element 100, the magnetoresistive film 104 extends in the track-width direction and in the element-height direction, between the lower magnetic-shield layer 102 and the upper magnetic-shield layer 106. A refill film 108 and a magnetic-domain-control film 110 are provided on either side of the magnetoresistive film 104. As shown in FIG. 5, the magnetoresistive film 104 includes a lower metal layer 112, an antiferromagnetic layer 114, a pinned ferromagnetic layer 116, an intermediate layer 118, a free ferromagnetic layer 120, and an upper metal layer 122, which are interposed between the lower magnetic-shield layer 102 and the upper magnetic-shield layer 106. The pinned ferromagnetic layer 116 and the free ferromagnetic layer 120 are isolated by the intermediate layer 118. The read element 100 has the feature that its resistance varies depending on an angle formed by a magnetization of the pinned ferromagnetic layer 116 and a magnetization of the free ferromagnetic layer 120. A change in resistance can be read, and, thereby, an external magnetic field can be measured. The air-bearing-surface protective film 126 is formed on a recording-medium-facing surface 124 of the magnetoresistive film 104. The air-bearing-surface protective film 126 is, preferably, about 1.5 nm in thickness, and includes an air-bearing-surface-protective-film adhesion layer 128 and an air-bearing-surface-protective-film top layer 130.

A soft magnetic material, such as a nickel-iron alloy, is used for each of the lower magnetic-shield layer 102 and the upper magnetic-shield layer 106. Tantalum, ruthenium, a nickel-iron alloy, or stacked films of such materials are preferred for the lower metal layer 112. An antiferromagnetic material, such as a platinum-manganese alloy or a manganese-iridium alloy, or a hard magnetic material, such as a cobalt-platinum alloy or a cobalt-chromium-platinum alloy, is preferred for the antiferromagnetic layer 114. A high-coercive-force film with antiparallel coupling, known as a self-pinned film, may be used as a hard-magnetic-material film. A highly spin-polarized material, such as a nickel-iron alloy, a cobalt-iron alloy, a cobalt-nickel-iron alloy, magnetite, or a Heusler alloy, or stacked films of such materials may be used for each of the pinned ferromagnetic layer 116 and the free ferromagnetic layer 120. Alternatively, a multilayer film, which includes ferromagnetic layers stacked via spacer layers of 1 nm or less in thickness, may be used. In instances where the TMR effect is utilized, a tunnel-barrier layer is used as the intermediate layer 118. Specifically, an oxide of aluminum, magnesium, silicon, zirconium, and/or titanium, for example, magnesium oxide (MgO), a mixture of such oxides, or a stacked body of such oxides may be used for the tunnel-barrier layer. Tantalum, ruthenium, a nickel-iron alloy, or a stacked film of such materials is preferred for the upper metal layer 122. Alumina ($Al_2O_3$) is preferred for the refill film 108. A hard magnetic material, such as a cobalt-platinum alloy or a cobalt-chromium-platinum alloy, is preferred for the magnetic-domain-control film 110. In instances where the magnetoresistive film 104 is a TMR film, the lower magnetic-shield layer 102 acts as a lower electrode, and the upper magnetic-shield layer 106 acts as an upper electrode.

The stacking order of the magnetoresistive film 104 is not limited to that described above; for example, the lower metal layer 112, the free ferromagnetic layer 120, the intermediate layer 118, the pinned ferromagnetic layer 116, the antiferromagnetic layer 114, and the upper metal layer 122 may be stacked in order on the lower magnetic-shield layer 102, and the upper magnetic-shield layer 106 may be stacked thereupon.

Figure 6:
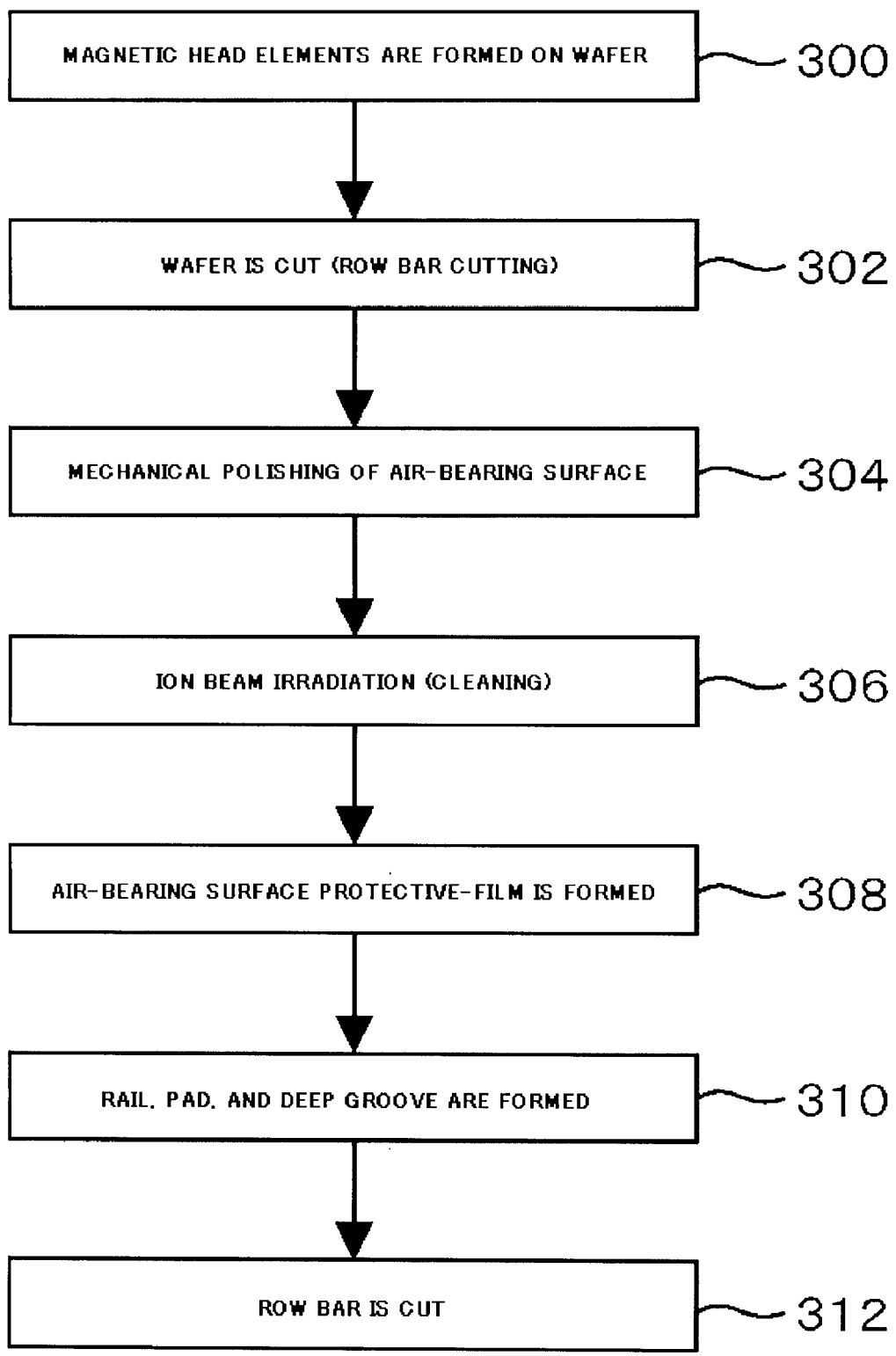
FIG. 6 is a flowchart of a method of manufacturing a magnetic head according to example 1.
Figure 7:
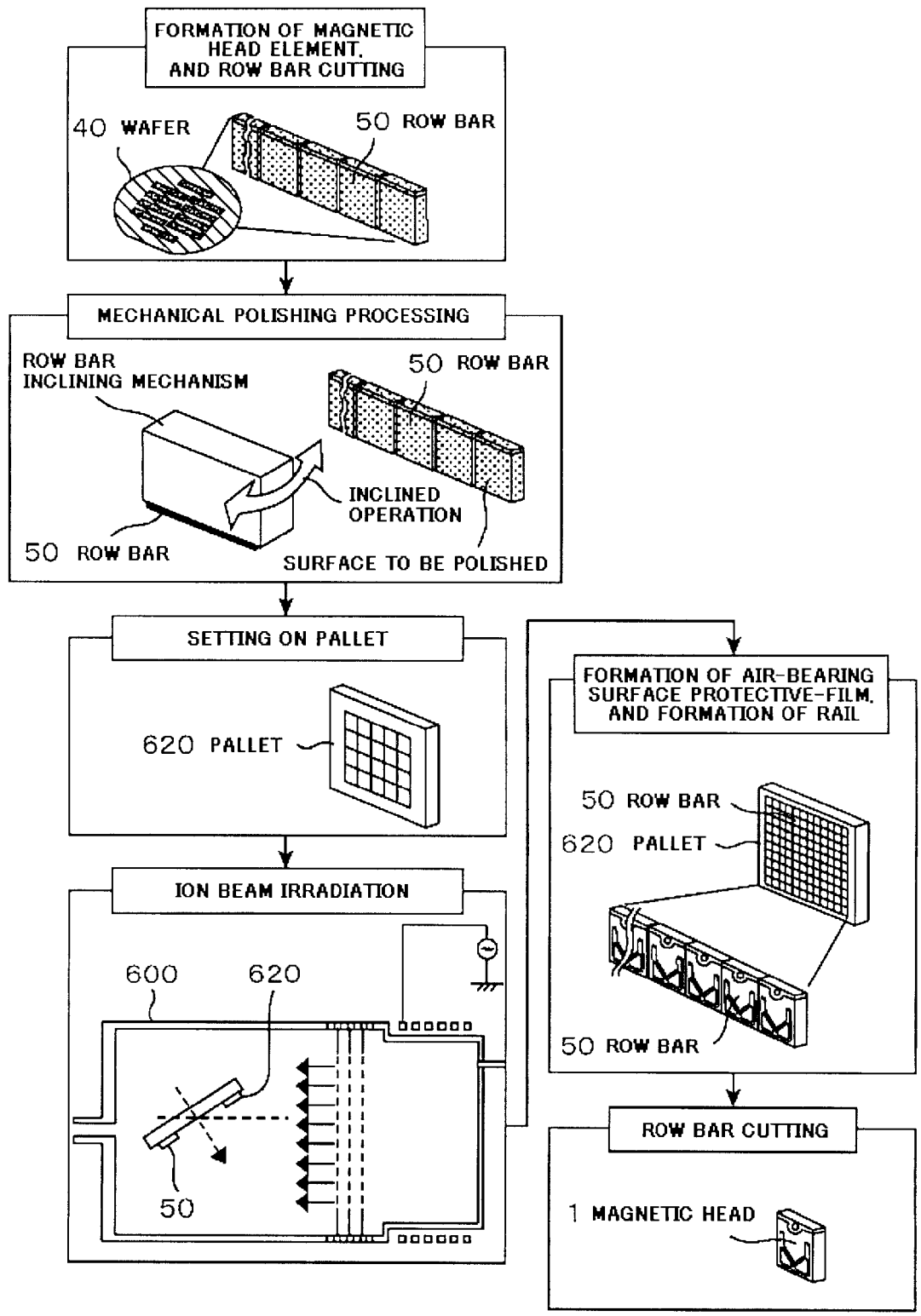
FIG. 7 is a schematic illustration of the method of FIG. 6.

Next, a method of manufacturing a magnetic head 1 according to example 1 is described using FIGS. 6 and 7. FIG. 6 shows a flowchart of the method of example 1, and FIG. 7 shows a schematic illustration of the method. In a first step 300, a plurality of magnetic-head elements 10, each comprising a read element 100 including a magnetoresistive film 104, are formed on an alumina/titanium carbide wafer 40, also known as a substrate. Then the wafer 40 is cut into strip-like row bars 50, each including a plurality of magnetic-head elements 10 in a row, in a second step 302. In a third step 304, a surface to be processed, also known as an air-bearing surface, of each of the row bars 50 is subjected to mechanical polishing through inclined operation, by using, for example, a rotating plate with abrasive diamond grains, such that a dimension of each magnetic-head element 10, such as element height or the like, has a desired value.

Figure 8:
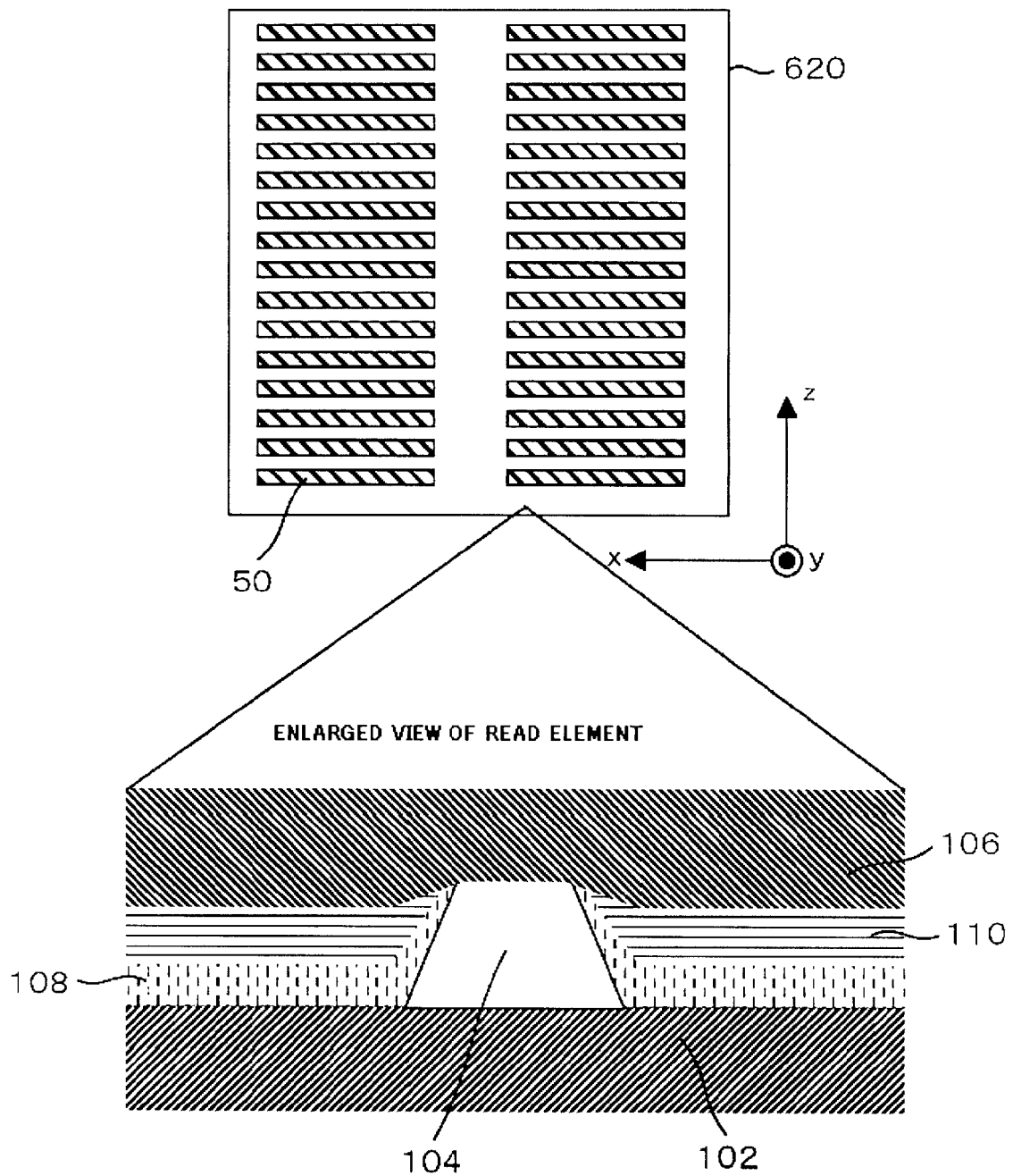
FIG. 8 is a top view of a pallet bearing row bars set according to the method of example 1.

After mechanical polishing is finished, the row bars 50 are set on a deposition pallet 620, such that all the row bars 50 have the same direction, as shown in FIG. 8. Alternatively, the row bars 50 may be set such that they have directions differing from one another by 180 degrees. Consequently, all the magnetic-head elements 10 are parallel or antiparallel to one another in a track-width direction of the magnetic-head elements 10.

Figure 9:
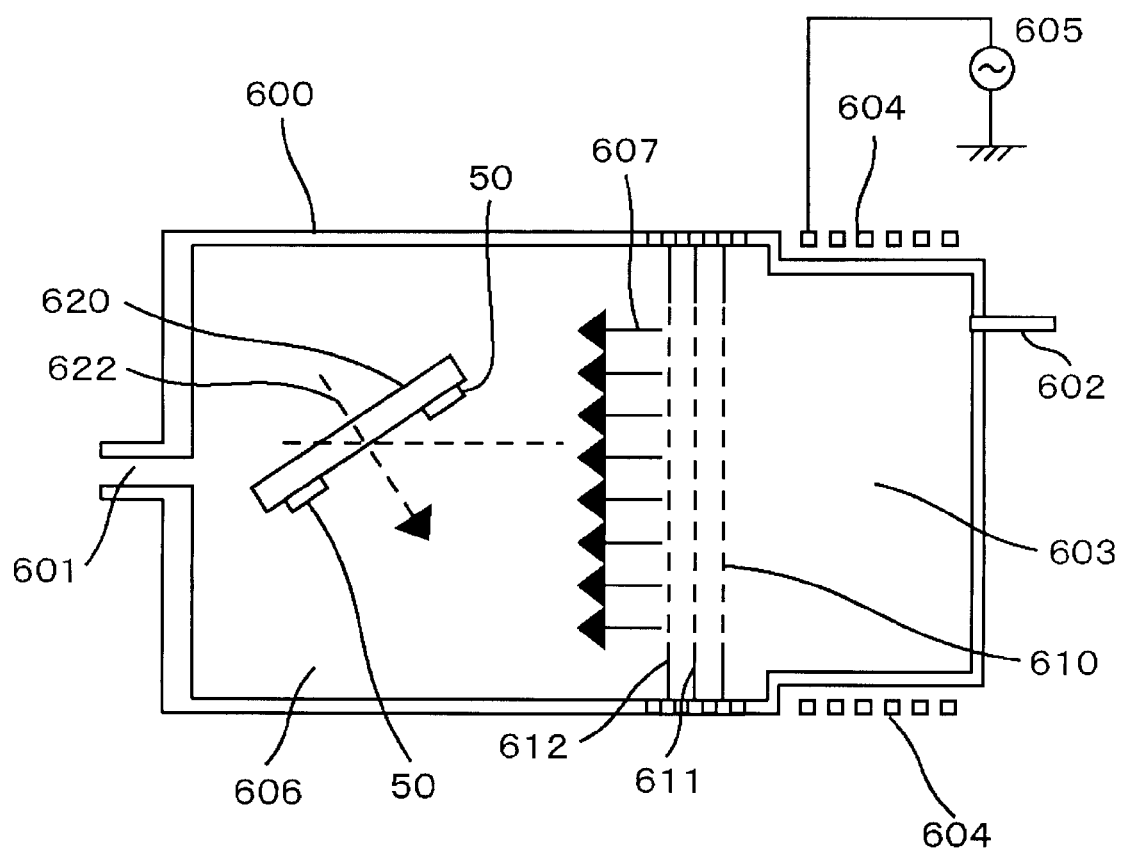
FIG. 9 is a schematic illustration of an ion-beam-irradiation apparatus for carrying out the method of example 1.

Next, in a fourth step 306, the pallet 620 bearing the row bars 50 is carried into a vacuum chamber 600 and subjected to ion-beam irradiation for cleaning, as shown schematically in FIG. 9. The vacuum chamber 600 is evacuated by a vacuum pump 601, and when a directional ion beam 607 is to be generated, argon gas is introduced into a plasma-generation module 603 through a gas inlet 602. A coil 604 is provided around the plasma-generation module 603, and a high-frequency voltage can be applied to the coil 604 by using a radio-frequency (RF) power supply 605 to generate a plasma within the plasma-generation module 603. A first electrode 610, a second electrode 611, and a third electrode 612 are provided between the plasma-generation module 603 and the sample-processing module 606. When an appropriate voltage is applied to the respective electrodes 610, 611, and 612, the ion beam 607 is generated to irradiate the row bars 50. The acceleration voltage of the ion beam 607 is the voltage applied to the first electrode 610. The pallet 620 may be inclined with respect to an ion-beam incidence direction. During ion-beam irradiation, the pallet 620 may be rotated about a normal 622 to a surface of the pallet 620.

Figure 1:
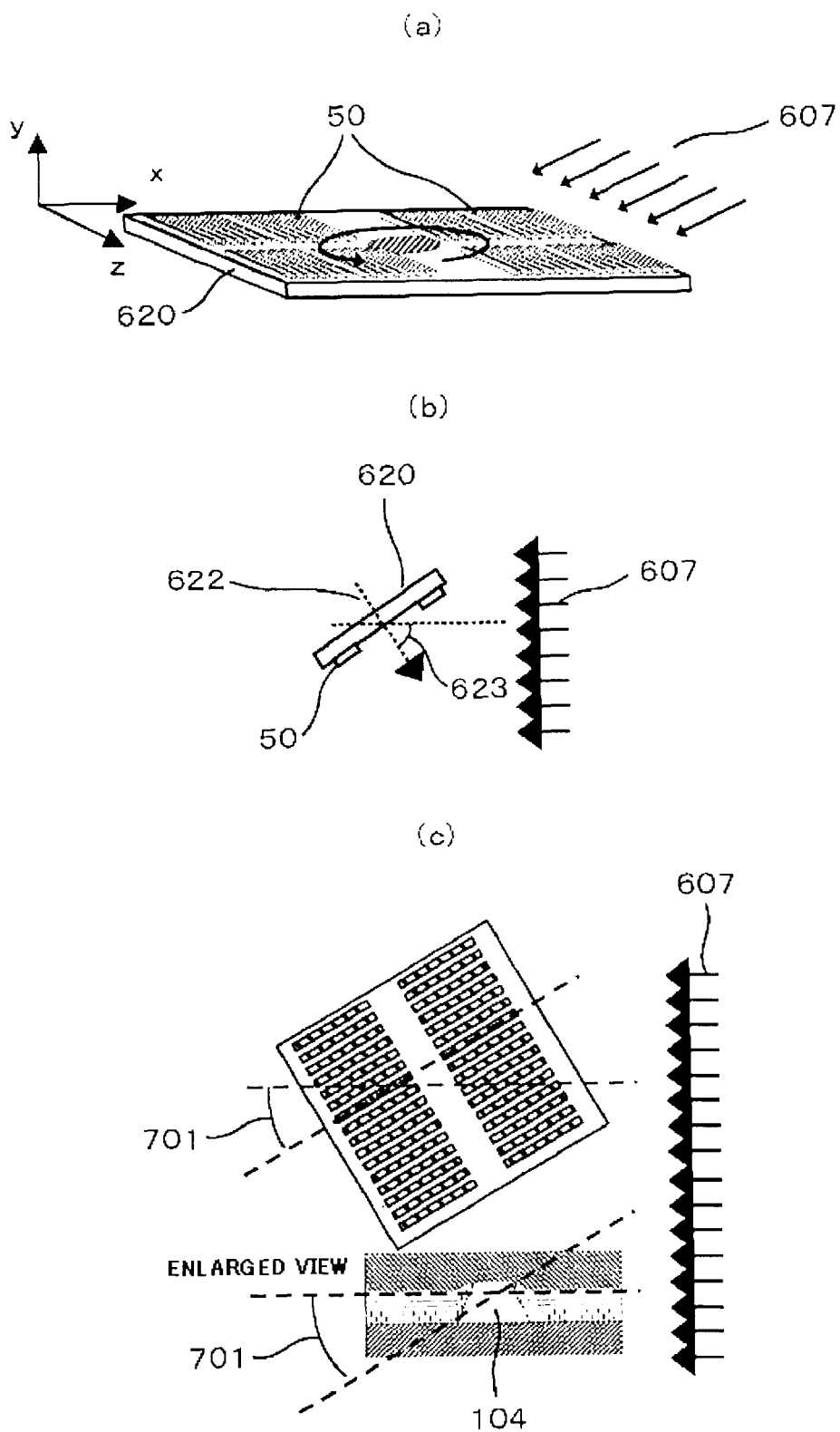
FIG. 1(a) is a perspective view of a pallet bearing row bars being irradiated by an ion beam according to the method of example 1.
FIG. 1(b) is a side view of the pallet of FIG. 1(a), showing an out-of-plane incidence angle of the ion beam.
FIG. 1(c) is a top view of the pallet of FIG. 1(a) and an enlarged view of a read element of a magnetic head in a row bar, showing an in-plane incidence angle of the ion beam.

FIG. 1 shows the relationship between the ion-beam incidence direction and the row bars 50 on the pallet 620. FIG. 1(a) shows how the ion beam 607 irradiates the air-bearing surfaces of the row bars 50 on the pallet 620. The ion-beam incidence angle includes two component angles, an out-of-plane incidence angle 623, shown in FIG. 1(b), and an in-plane incidence angle 701, shown in FIG. 1(c). The out-of-plane incidence angle 623 is an angle formed by the normal 622 to the surface of the pallet 620 and by the ion-beam incidence direction. On the other hand, the in-plane incidence angle 701 is an angle formed by an orthographic projection of the ion-beam incidence direction onto the air-bearing surface of each of the row bars 50 and by the track-width direction.

The pallet 620 bearing the row bars 50 is first carried into the sample-processing module 606 of the vacuum chamber 600, where the row bars 50 are subjected to ion-beam irradiation. Ion-beam irradiation is performed using an argon beam at an acceleration voltage of 300 V and at an out-of-plane incidence angle 623 of 75 degrees. In addition, ion-beam irradiation is performed while in-plane rotation of the pallet 620 is stopped, preferably, such that the in-plane incidence angle 701 of the ion beam 607 is 90 degrees. However, while the in-plane incidence angle 701 is, preferably, 90 degrees, it is not limited to 90 degrees, but may be in a range of 30 degrees to 150 degrees or a range of 210 degrees to 330 degrees. Moreover, the acceleration voltage for ion-beam irradiation is not limited to 300 V, but may be in a range of 50 V to 5000 V. While the out-of-plane incidence angle 623 is 75 degrees in the method of example 1, it is not limited to 75 degrees, but may be in a range of 40 degrees to 88 degrees. While argon was used as the gas, other noble gases, such as helium, neon, krypton, and xenon, may be used in addition to argon.

Subsequent to ion-beam irradiation, the pallet 620 bearing the row bars 50 is carried into a protective-film-formation module within the vacuum chamber 600, where an air-bearing-surface protective film 126 including an air-bearing-surface-protective-film adhesion layer 128 and an air-bearing-surface-protective-film top layer 130 is formed on the air-bearing surface of each of the row bars 50, in a fifth step 308, according to the following procedure. To form an air-bearing-surface-protective-film adhesion layer 128 including a silicon nitride film, a silicon target may be sputtered by an ion beam generated from argon gas and nitrogen gas. Alternatively, a silicon nitride target may be sputtered. In yet another alternative, the target may be sputtered using a gas plasma instead of an ion beam. According to this process, a silicon nitride film of 0.5 nm in thickness may be formed on the row bars 50. For the air-bearing-surface-protective-film adhesion layer 128, not only silicon nitride, but also silicon, silicon oxide, tantalum, tantalum oxide, boron, boron nitride, titanium, titanium nitride, titanium carbide, or a mixture of such materials may be used.

Subsequent to formation of the air-bearing-surface-protective-film adhesion layer 128, the air-bearing-surface-protective-film top layer 130 is formed. To form an air-bearing-surface-protective-film top layer 130 including a carbon film, cathodic vacuum arc evaporation may be used. According to this process, a carbon film of 1.0 nm in thickness may be formed. Alternatively, a carbon film may be formed by sputtering or by chemical vapor deposition (CVD).

Typically, the air-bearing-surface protective film 126 resulting from the formation of a silicon nitride film and a carbon film, as described above, is 1.5 nm in thickness. However, the thickness of the air-bearing-surface protective film 126 is not limited to this thickness, as long as sufficient corrosion resistance and wear resistance can be secured. Moreover, the air-bearing-surface protective film 126 need not have a two-layer structure. Furthermore, the air-bearing-surface-protective-film top layer 130 may be subjected to surface treatment after the air-bearing surface protective film 126 is formed.

After forming the air-bearing-surface protective film 126, the pallet 620 bearing the row bars 50 is removed from the vacuum chamber 600, and the row bars 50 are repeatedly subjected to resist coating, exposure, and ion-beam irradiation to form a rail 16, pads 12 and 14, and a deep groove 18 on the air-bearing surface of each row bar 50, in a sixth step 310. Finally, the row bars 50 are mechanically cut into individual magnetic heads 1, in a seventh step 312.

In the method of example 1, the air-bearing surfaces of the row bars 50 were mechanically polished, the polished air-bearing surfaces were subjected to ion-beam irradiation, the air-bearing-surface protective film 126 was formed, the rail 16, the pads 12 and 14, and the deep groove 18 were formed, and then the row bars 50 were cut into individual magnetic heads 1. However, the following order of steps is also acceptable: the air-bearing surfaces of the row bars 50 are mechanically polished, the row bars 50 are cut into individual magnetic-head elements 10, and then the cut magnetic-head elements 10 are subjected to ion-beam irradiation, the air-bearing-surface protective film 126 is formed, and the rail 16, the pads 12 and 14, and the deep groove 18 are formed to complete the magnetic heads 1.

Figure 10:
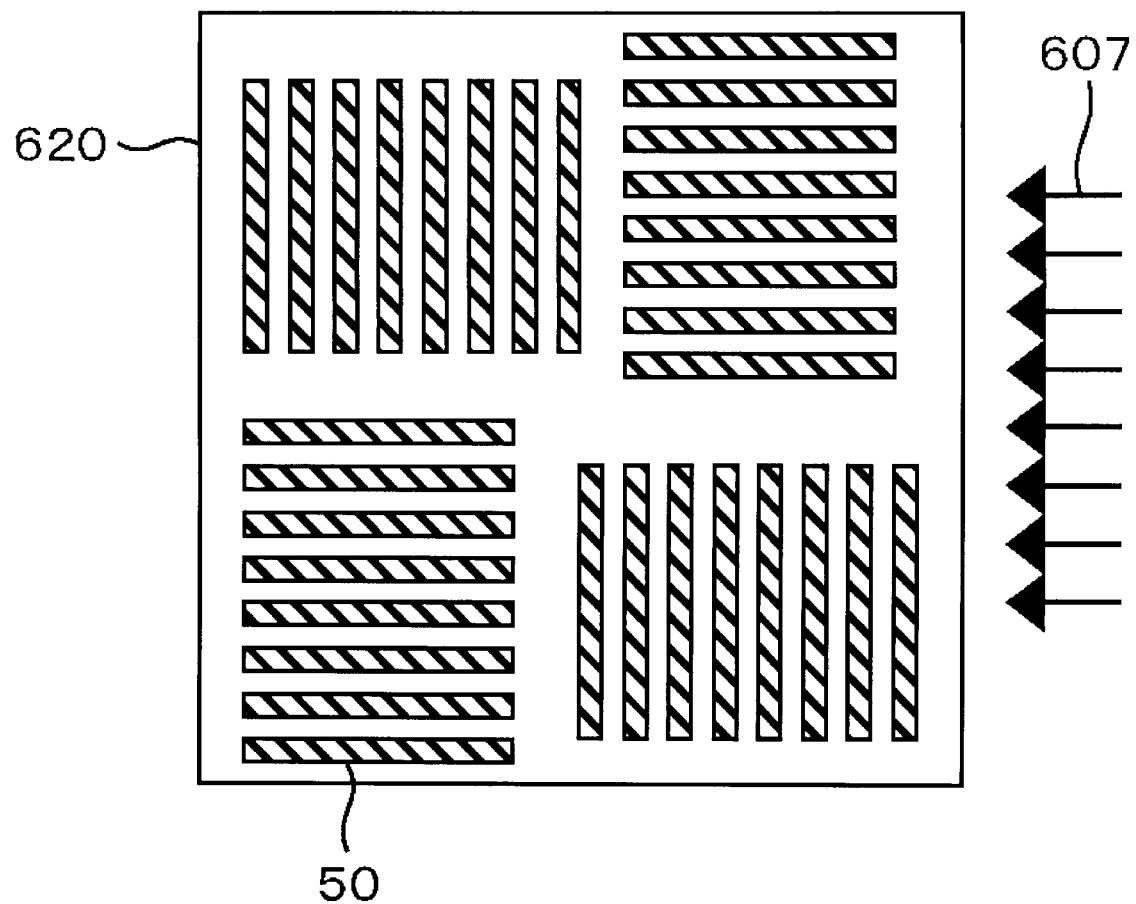
FIG. 10 is a top view of a pallet bearing row bars set according to the method of comparative example 1.

Next, an advantage of the method of example 1 is described in relation to methods of comparative examples 1 and 2. A method of manufacturing a magnetic head 1 according to comparative example 1 is the same as the method of example 1, except for the setting of the row bars 50 and the ion-beam-irradiation step. In the method of comparative example 1, the row bars 50 were set on the deposition pallet 620 without particularly controlling the directions of the row bars 50, as shown in FIG. 10. In contrast, in the method of example 1, the row bars 50 were set on the deposition pallet 620 such that all the row bars 50 had the same direction, as shown in FIG. 8. In the ion-beam-irradiation step of the method of comparative example 1, irradiation was performed using an argon beam at an acceleration voltage of 300 V and at an out-of-plane incidence angle 623 of 75 degrees, while the deposition pallet 620 bearing the row bars 50 was rotated about the normal 622 to the surface of the pallet 620.

A method of manufacturing a magnetic head 1 according to comparative example 2 is the same as the method of example 1, except for the ion-beam-irradiation step. In the ion-beam-irradiation step of the method of comparative example 2, ion-beam irradiation was performed while in-plane rotation of the deposition pallet 620 was stopped, such that the in-plane incidence angle 701 of the ion beam 607 was 0 degrees with respect to the track-width direction. Irradiation was performed using an argon beam at an acceleration voltage of 300 V and at an out-of-plane incidence angle 623 of 75 degrees.

Reproducing output signals were measured for the read elements 100 of magnetic heads 1 manufactured by the method of example 1 and of comparative examples 1 and 2, in the following manner. First, a conductor line was connected to the lower magnetic-shield layer 102, which acts as a lower electrode, and the upper magnetic-shield layer 106, which acts as an upper electrode, provided on lower and upper sides of the magnetoresistive film 104 of the magnetic head 1, respectively, as well as to a voltage-measurement apparatus. Then, a sensing current was passed between the upper and lower electrodes, so that a magnetic field was generated near the read element 100 of the magnetic head 1. The change in resistance caused by the magnetic field was measured, and, thereby, the reproducing output signal of the read element 100 was measured. A non-defective-product ratio after the ion-beam-irradiation step was evaluated according to the following procedure. First, the mechanically polished row bars 50 were subjected to ion-beam irradiation to remove any short circuits due to smear. The reproducing output signals of the read elements 100 of the magnetic heads 1 were subsequently measured in the manner described heretofore. Then ion-beam irradiation and protective-film formation were performed according to the methods of example 1 and of comparative examples 1 and 2, and the reproducing output signals of the read elements of the magnetic heads 1 were measured again in the manner described heretofore. The reproducing output signals before and after ion-beam irradiation were compared, and magnetic heads 1 with reproducing output signals decreased by more than a certain ratio were considered defective. As determined by such an evaluation, the non-defective-product ratios after the respective ion-beam-irradiation steps of the methods of example 1 and of comparative examples 1 and 2 are listed in FIG. 11. While the non-defective-product ratio of the magnetic heads 1 prepared by the method of example 1 was 100%, the non-defective-product ratio of the magnetic heads 1 prepared by the method of comparative example 1 was 71%, and the non-defective-product ratio of the magnetic heads 1 prepared by the method of comparative example 2 was 1%. Thus, magnetic heads 1 having high reproducing output signals are provided at a high non-defective-product ratio by using the method of example 1 of the present invention.

Figures 11, 12:
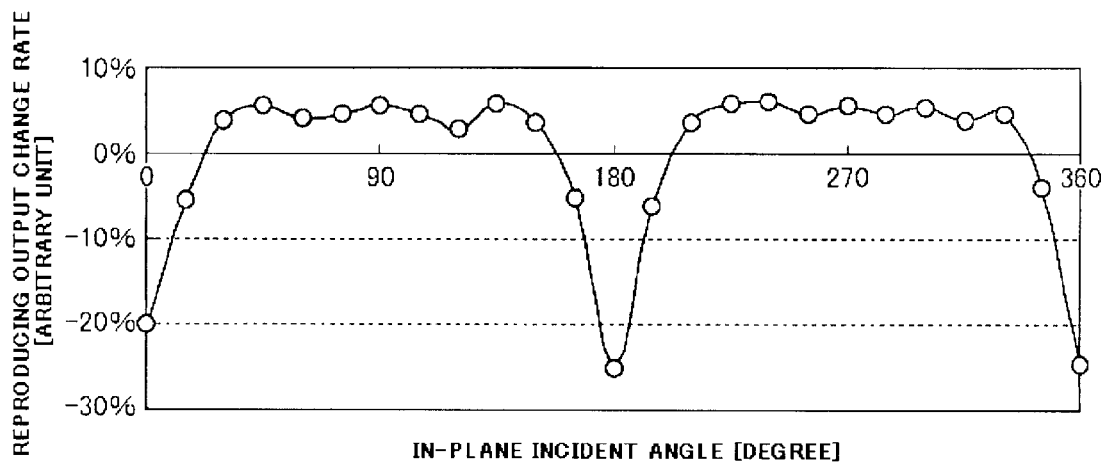
FIG. 11 is a table listing a non-defective-product ratio for the methods of example 1 and of comparative examples 1 and 2.
FIG. 12 is a plot of change in reproducing output signal of read elements of magnetic heads manufactured by the method of example 1 as a function of ion-beam in-plane incidence angle.
Figure 13:
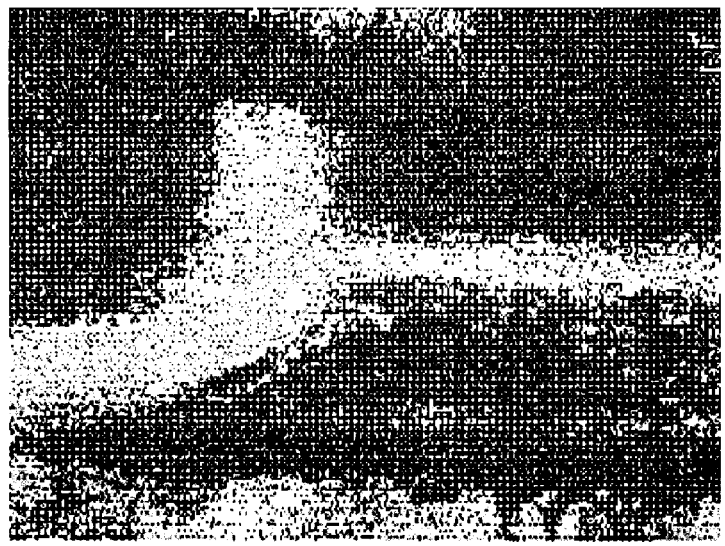
FIG. 13(a) is a transmission electron micrograph of a read element of a magnetic head manufactured by the method of example 1.
FIG. 13(b) is a transmission electron micrograph of a read element of a magnetic head manufactured by the method of comparative example 2.
Figure 13:
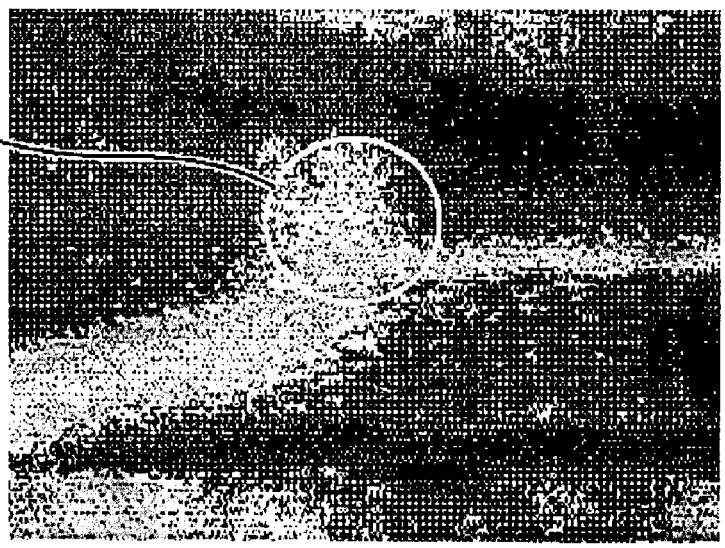

Next, FIGS. 12 and 13 are used to describe the dependence of the change in reproducing output signal of read elements 100 of magnetic heads 1 manufactured by the method of example 1 on the ion-beam in-plane incidence angle 701. In FIG. 12, the horizontal axis represents the in-plane incidence angle 701, and the vertical axis represents the relative change in reproducing output signal before and after ion-beam irradiation. As shown in FIG. 12, a reduction in reproducing output signal was observed for in-plane incidence angles 701 of 0 degrees to 30 degrees, of 150 degrees to 210 degrees, and of 330 degrees to 360 degrees.

FIG. 13 shows transmission electron micrographs of a read element 100 of a magnetic head 1 manufactured by the method of example 1, which has not undergone a significant reduction in reproducing output signal and of a read element of a magnetic head 1 manufactured by the method of comparative example 2, which has undergone a reduction in reproducing output signal. As shown in FIG. 13(a), in the magnetic head 1 manufactured by the method of example 1, a portion of the refill film 108 appears white, indicating that mixing of metal atoms from a neighboring metal layer does not occur. On the other hand, in the magnetic head 1 manufactured by the method of comparative example 2, the refill film 108 appears partially gray, as shown in FIG. 13(b). This gray appearance occurs because an atom having a large mass number is present on an end face at an air-bearing surface of the refill film 108. The atom having a large mass number is presumed to be a metal atom mixed from a metal layer near the refill film 108. In this way, a conductive metal film is formed on a surface of the refill film 108, thereby, forming a short circuit, which leads to a reduction in reproducing output signal.

In the ion-beam-irradiation step of the method of example 1, the in-plane incidence angle 701 of the ion beam 607 was controlled to be in a range of 30 degrees to 150 degrees or of 210 degrees to 330 degrees with respect to the track-width direction, with a preferred value of 90 degrees. However, alternatively, the deposition pallet 620 may be rotated about the normal 622 to the surface of the pallet 620, such that the in-plane incidence angle 701 of the ion beam 607 oscillates between 30 degrees and 150 degrees or between 210 degrees and 330 degrees, as in the method of example 2.

Furthermore, the deposition pallet 620 may be rotated about the normal 622 to the surface of the pallet 620 and irradiated with the ion beam 607 only when the in-plane incidence angle 701 of the ion beam 607 is of 30 degrees to 150 degrees or of 210 degrees to 330 degrees, as in the method of example 3.

Moreover, another ion-beam-irradiation step having different ion-beam-irradiation conditions may be included before the ion-beam-irradiation step of the method of example 1. Specifically, in the method of example 4, as a first ion-beam-irradiation step, while the deposition pallet 620 bearing the row bars 50 is rotated about the normal 622 to the surface of the pallet 620, ion-beam irradiation is performed using an argon beam at an acceleration voltage of 300 V and at an out-of-plane incidence angle 623 of 75 degrees. Then, as a second ion-beam-irradiation step, or a final ion-beam-irradiation step, ion-beam irradiation may be performed at an in-plane incidence angle 701 of 30 degrees to 150 degrees or of 210 degrees to 330 degrees. Any metal-atom layer on the refill film 108 caused by the first ion-beam-irradiation step is removed by the second ion-beam-irradiation step, and, thereby, magnetic heads 1 may be manufactured at a high non-defective-product ratio.

Of course, numerous other embodiments of the present invention may be envisaged without departing from the spirit and scope of the invention.

We claim:

1. A method of manufacturing a magnetic head comprising a read element including a magnetoresistive film, said method comprising:
   a) mechanically polishing an air-bearing surface of the read element; and
   b) irradiating the mechanically polished air-bearing surface of the read element with an ion beam, such that an in-plane incidence angle, formed by an orthographic projection of an ion-beam incidence direction onto the air-bearing surface of the read element and by a track-width direction of the magnetic head, is only of 30 degrees to 150 degrees or of 210 degrees to 330 degrees.

2. The method of claim 1, wherein the magnetic head is rotated about a normal to a surface of the magnetic head, such that the in-plane incidence angle oscillates only between 30 degrees and 150 degrees or between 210 degrees and 330 degrees, while the air-bearing surface of the read element is irradiated with the ion beam.

3. The method of claim 1, wherein the magnetic head is rotated about a normal to a surface of the magnetic head, and the air-bearing surface of the read element is irradiated with the ion beam only when the in-plane incidence angle is of 30 degrees to 150 degrees or of 210 degrees to 330 degrees.

4. The method of claim 1, further comprising, prior to b), irradiating the air-bearing surface of the read element with the ion beam, while the magnetic head is rotated about a normal to a surface of the magnetic head.

5. The method of claim 1, wherein an out-of-plane incidence angle, formed by the ion-beam incidence direction and by a normal to a surface of the magnetic head, is of 40 degrees to 88 degrees.

6. A method of manufacturing a plurality of magnetic heads, comprising:
   a) forming a plurality of magnetic-head elements on a wafer, each magnetic-head element comprising a read element including a magnetoresistive film;
   b) cutting the wafer into row bars, each row bar comprising a respective plurality of magnetic-head elements in a row;
   c) mechanically polishing an air-bearing surface of each row bar;
   d) cleaning the mechanically polished air-bearing surface of each row bar by using a directional ion beam, including:
      i) setting the row bars on a pallet, such that the magnetic-head elements are parallel or antiparallel to one another in a track-width direction of the magnetic-head elements, and
      ii) irradiating the air-bearing surface of each row bar with the ion beam, such that an in-plane incidence angle, formed by an orthographic projection of an ion-beam incidence direction onto the air-bearing surface of each row bar and by the track-width direction, is only of 30 degrees to 150 degrees or of 210 degrees to 330 degrees;

e) forming an air-bearing-surface protective film on the cleaned air-bearing surface of each row bar;

f) forming a rail, pads, and a deep groove on the air-bearing surface bearing the air-bearing-surface protective film of each row bar; and g) cutting each row bar into the respective plurality of magnetic-head elements.

7. The method of claim 6, wherein, in ii), the pallet is rotated about a normal to a surface of the pallet, such that the in-plane incidence angle oscillates only between 30 degrees and 150 degrees or between 210 degrees and 330 degrees, while the air-bearing surface of each row bar is irradiated with the ion beam.

8. The method of claim 6, wherein, in ii), the pallet is rotated about a normal to a surface of the pallet, and the air-bearing surface of each row bar is irradiated with the ion beam only when the in-plane incidence angle is of 30 degrees to 150 degrees or of 210 degrees to 330 degrees.

9. The method of claim 6, wherein d) further includes, prior to ii), irradiating the air-bearing surface of each row bar with the ion beam, while the pallet is rotated about a normal to a surface of the pallet.

10. The method of claim 6, wherein an out-of-plane incidence angle, formed by the ion-beam incidence direction and by a normal to a surface of the pallet, is of 40 degrees to 88 degrees.

11. The method of claim 6, wherein the magnetoresistive film comprises a tunnel barrier layer between a pinned ferromagnetic layer and a free ferromagnetic layer.

12. A method of manufacturing a plurality of magnetic heads, comprising:

a) forming a plurality of magnetic-head elements on a wafer, each magnetic-head element comprising a read element including a magnetoresistive film;

b) cutting the wafer into row bars, each row bar including a respective plurality of magnetic-head elements in a row;

c) mechanically polishing an air-bearing surface of each row bar;

d) cutting each row bar into the respective plurality of magnetic-head elements;

e) cleaning a mechanically polished air-bearing surface of each magnetic-head element by using a directional ion beam, including:

i) setting the magnetic-head elements on a pallet, such that the magnetic-head elements are parallel or anti-parallel to one another in a track-width direction of the magnetic-head elements, and ii) irradiating the air-bearing surface of each magnetic-head element with the ion beam, such that an in-plane incidence angle, formed by an orthographic projection of an ion-beam incidence direction onto the air-bearing surface of each magnetic-head element and by the track-width direction, is only of 30 degrees to 150 degrees or of 210 degrees to 330 degrees;

f) forming an air-bearing-surface protective film on the cleaned air-bearing surface of each magnetic-head element; and g) forming a rail, pads, and a deep groove on the air-bearing surface bearing the air-bearing-surface protective film of each magnetic-head element.

13. The method of claim 12, wherein, in ii), the pallet is rotated about a normal to a surface of the pallet, such that the in-plane incidence angle oscillates only between 30 degrees and 150 degrees or between 210 degrees and 330 degrees, while the air-bearing surface of each row bar is irradiated with the ion beam.

14. The method of claim 12, wherein, in ii), the pallet is rotated about a normal to a surface of the pallet, and the air-bearing surface of each magnetic-head element is irradiated with the ion beam only when the in-plane incidence angle is of 30 degrees to 150 degrees or of 210 degrees to 330 degrees.

15. The method of claim 12, wherein e) further includes, prior to ii), irradiating the air-bearing surface of each magnetic-head element with the ion beam, while the pallet is rotated about a normal to a surface of the pallet.

16. The method of claim 12, wherein an out-of-plane incidence angle, formed by the ion-beam incidence direction and by a normal to a surface of the pallet, is of 40 degrees to 88 degrees.

* * * * *